May 12, 1931.  H. E. GARDEN  1,804,762
WIRE LINE CLAMP
Filed May 31, 1929
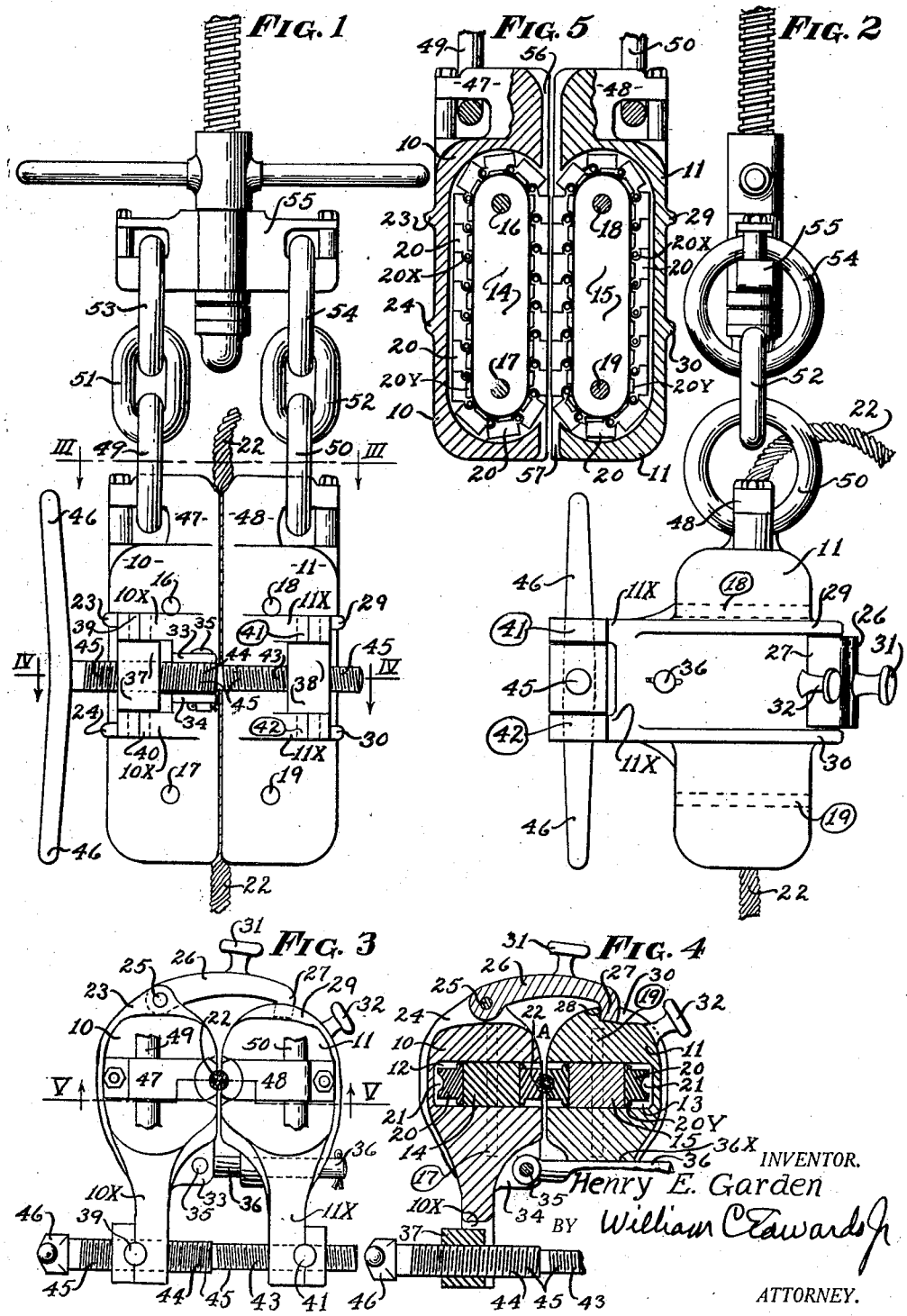
INVENTOR.
Henry E. Garden
BY William C Edwards Jr
ATTORNEY.

Patented May 12, 1931

1,804,762

UNITED STATES PATENT OFFICE

HENRY E. GARDEN, OF AUGUSTA, KANSAS

WIRE LINE CLAMP

Application filed May 31, 1929. Serial No. 367,305.

The invention relates to an improvement in wire line clamps such as are used in oil well drilling equipment.

The object of the invention is to provide a clamp through which the drilling cable may be slipped without damaging the cable.

In the drawings; Fig. 1 represents a front view of my improved clamp as mounted on the usual temper screw. Fig. 2 shows a side view of Fig. 1. Fig. 3 is a plan view of Fig. 1 as taken along the line III—III in Fig. 1 and looking in the direction of the arrows. Fig. 4 is a sectional view taken along the line IV—IV in Fig. 1. Fig. 5 is a sectional view taken along the line V—V in Fig. 3 looking in the direction of the arrows. Similar numerals of reference indicate corresponding parts throughout all the figures of the drawings.

Referring to the drawings; at 10 and 11 are shown paired body housing members hollowed out as seen at 12 and 13. Within the space 12 and within the space 13 are inserted the paired block members 14 and 15 and rigidly positioned therein by the pins 16, 17 and 18, 19 as disclosed, the pins passing through the blocks and body members. Around each block is an endless chain mechanism composed of a plurality of cable clamping elements 20 as individual links hinged together as at 20x. Each element 20 has a widened base 20y bearing against the adjacent block and between the side walls of the housing member. The face of the element 20 is hollowed out as at 21 forming a shoe-like face to receive the cable 22. It will be understood that my endless chain mechanism is not exposed as in the prior art. As it operates wholly within the body members 10 and 11 around the blocks 14 and 15, it may run in an oil bath while presenting a continuous face to the wire line.

Upon the exterior of the member 10 are the paired ribs 23 and 24 and between these ribs is pivotally mounted at 25 the member 26 having a hook end portion 27 adapted to engage the raised portion 28 intermediate the paired ribs 29 and 30 on the member 11. A knob 31 on the member 26 serves as a handle for lifting purposes while at 32 is a knob on the member 11 also for handling purposes. At 33 and 34 are ear-like elements integral with the member 10 and between them at 35 is pivotally mounted a shaft 36 which extends through a hole 36x in the member 11. At 10x and 11x are projecting portions of the members 10 and 11, each terminating in a U-shaped portion within which are respectively housed the blocks 37 and 38 provided with integral projecting pins 39—40 and 41—42, respectively, making a bearing as seen in Figs. 1 and 3. The blocks 37 and 38 are threaded, one with a right hand thread, the other with a left hand thread, to receive the right and left hand threaded screws on the shaft 45. The shaft 45 is provided with the cross handle 46 for turning the screws. At 47 and 48 are hook end portions of the members 10 and 11 for receiving the paired links 49 and 50, connecting by the intermediate links 51 and 52 to the upper links 53 and 54 which engage the coupling 55 of the ordinary temper screw illustrated. These links provide flexibility to prevent bending of the temper screw at the time of changing the load from the temper screw to the wire line.

At 56 and 57 are shown passages through the blocks 10 and 11 through which the cable 22 will freely pass at all times.

The mechanism operates as follows: the screw 45 may be turned to release the pressure between the blocks 10 and 11, after which by raising on the knobs 31 and 32, the member 26 is detached from engagement with the boss 28 and the members 10 and 11 may be swung apart. The rod 36 merely slides in the hole 36x and functions as a guide for the members 10 and 11 and as a hinge at the point 35. After this operation is completed, the wire line cable 22 may be permitted to be slipped in at the opening A Fig. 4 and positioned between the opposed blocks 20, after which the member 26 and 27 is swung back and engaged with the boss 28 Figs. 3 and 4 and the screw 45 tightened until the cable 22 is tightly clamped between the paired chains composed of the members 20 and which friction against the blocks 14 and 15. The clamp and cable is now ready for drilling operations. There are times when it is desirable to drop the bit further than the temper screw will permit.

Then the clamp has been loosened slightly and the weight of the bit has caused the wire line cable to slip through the clamp; this has resulted in damaging the line as well as wearing the clamp, so that it has been hard to make the clamp hold the line afterwards. By means of my improved clamping device this objection has been overcome.

This operation is now performed with my improved clamp as follows: the screw 45 is turned to release the clamping pressure of the blocks 10 and 11 and the weight of the bit pulls the line through the passages 56—57 but instead of sliding along the faces of the clamp it causes the paired chains 20—20 to roll around the members 14 and 15 during the downward travel of the line 22. After the desired drop has been obtained, the clamp is again tightened by means of the screw 45 and the drilling operation resumed.

In dropping the bit as described, some wear will develop on the back sides of the members 20y and the face of the members 14 and 15. This wear can be partially overcome by removing the blocks 14 and 15 and turning them around so that the opposite faces will be subjected to the wear.

Such modifications may be employed as lie within the scope of the appended claims.

Having fully described my invention, what I now claim as new and desire to secure by Letters Patent is:

1. In a device of the class described a pair of housing members arranged side by side and with hollowed out spaces for receiving endless chain elements; a block within each housing member and rigid thereto and a chain element enveloping its respective block; each chain link having its outer face hollowed as a shoe for contacting an intermediate wire cable; an extended portion for each housing member, each having a threaded block adapted to receive a threaded clamping shaft; a shaft having right hand and left hand threaded portions for cooperation with said threaded blocks; a shaft hinged to one block and passing through a hole through the second housing block as a guiding means; and a hinged latch on one housing member and a boss on the other housing member adapted for latching engagement.

2. In a device of the class described; a pair of side by side housing members; a pair of endless chain elements, one for each member and housed therein, each link element having a face portion fashioned as a show for contacting a wire cable; and block means for each housing member and around which its chain element may slide; latch means for engaging the tops of the housing members and screw clamping means for contracting and expanding the bases of said paired housing members.

3. In a wire line clamping device, a pair of side by side housing members having hollowed out spaces receiving and enclosing endless chain elements; a block within each housing member and detachably affixed thereto as a track for a chain element.

4. In a device as described in claim 3; a chain enveloping its respective block.

5. In a device as described in claim 3; a chain enveloping its respective block, said chain comprising a plurality of cable clamping elements as individual links, each link having a widened base bearing against the adjacent block and between the side walls of the housing member, the face of said link forming a shoe for receiving a cable.

6. In a device as described in claim 3; and a pair of chains, one for and enveloping each block and spaced apart as a cable passage; and a cable receivable within said cable passage.

In testimony whereof I affix my signature.

HENRY E. GARDEN.